US010286314B2

(12) United States Patent
Marr et al.

(10) Patent No.: US 10,286,314 B2
(45) Date of Patent: May 14, 2019

(54) SYSTEM AND METHOD FOR PROVIDING CONTINUOUS GAMEPLAY IN A MULTIPLAYER VIDEO GAME THROUGH AN UNBOUNDED GAMEPLAY SESSION

(71) Applicant: ACTIVISION PUBLISHING, INC., Santa Monica, CA (US)

(72) Inventors: Michael D. Marr, Monroe, WA (US); Keith S. Kaplan, Bothell, WA (US); Nathan T. Lewis, Woodinville, WA (US)

(73) Assignee: ACTIVISION PUBLISHING, INC., Santa Monica, CA (US)

(*) Notice: Subject to any disclaimer, the term of this patent is extended or adjusted under 35 U.S.C. 154(b) by 489 days.

(21) Appl. No.: 14/712,387

(22) Filed: May 14, 2015

(65) Prior Publication Data
US 2016/0332073 A1    Nov. 17, 2016

(51) Int. Cl.
| A63F 9/00 | (2006.01) |
| A63F 13/44 | (2014.01) |
| A63F 13/46 | (2014.01) |
| A63F 13/795 | (2014.01) |
| A63F 13/48 | (2014.01) |
| A63F 13/73 | (2014.01) |

(52) U.S. Cl.
CPC .............. *A63F 13/44* (2014.09); *A63F 13/46* (2014.09); *A63F 13/48* (2014.09); *A63F 13/795* (2014.09); *A63F 13/73* (2014.09)

(58) Field of Classification Search
None
See application file for complete search history.

(56) References Cited

U.S. PATENT DOCUMENTS

| 5,530,796 A | 6/1996 | Wang |
| 5,561,736 A | 10/1996 | Moore |
| 5,563,946 A | 10/1996 | Cooper |
| 5,685,775 A | 11/1997 | Bakoglu |
| 5,706,507 A | 1/1998 | Schloss |
| 5,708,764 A | 1/1998 | Borrel |

(Continued)

FOREIGN PATENT DOCUMENTS

| AU | 768367 | 3/2004 |
| AU | 2005215048 | 10/2011 |

(Continued)

OTHER PUBLICATIONS

Salen, Katie. "Rules of Play: Game Design Fundamentals". 2004. MIT Press. p. 219.*

(Continued)

*Primary Examiner* — Seng Heng Lim
(74) *Attorney, Agent, or Firm* — Novel IP

(57) ABSTRACT

A system and method is provided for continuous gameplay in a multiplayer video game through an unbounded gameplay session. Players may join, exit, and later rejoin a given unbounded gameplay session at any time. A given unbounded gameplay session may therefore continue indefinitely so long as at least one player wishes to continue to gameplay. To facilitate an unbounded gameplay session, the system may score players using time-based or other parameters in a manner that is fair to players who have been playing in the unbounded gameplay session longer than other players.

26 Claims, 7 Drawing Sheets

(56) References Cited

U.S. PATENT DOCUMENTS

| | | |
|---|---|---|
| 5,736,985 A | 4/1998 | Lection |
| 5,737,416 A | 4/1998 | Cooper |
| 5,745,678 A | 4/1998 | Herzberg |
| 5,762,552 A | 6/1998 | Vuong |
| 5,768,511 A | 6/1998 | Galvin |
| 5,825,877 A | 10/1998 | Dan |
| 5,835,692 A | 11/1998 | Cragun |
| 5,878,233 A | 3/1999 | Schloss |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,923,324 A | 7/1999 | Berry |
| 5,969,724 A | 10/1999 | Berry |
| 5,977,979 A | 11/1999 | Clough |
| 5,990,888 A | 11/1999 | Blades |
| 6,014,145 A | 1/2000 | Bardon |
| 6,025,839 A | 2/2000 | Schell |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,179,713 B1 | 1/2001 | James |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,311,206 B1 | 10/2001 | Malkin |
| 6,334,141 B1 | 12/2001 | Varma |
| 6,336,134 B1 | 1/2002 | Varma |
| 6,337,700 B1 | 1/2002 | Kinoe |
| 6,353,449 B1 | 3/2002 | Gregg |
| 6,356,297 B1 | 3/2002 | Cheng |
| 6,411,312 B1 | 6/2002 | Sheppard |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,466,550 B1 | 10/2002 | Foster |
| 6,469,712 B1 | 10/2002 | Hilpert, Jr. |
| 6,473,085 B1 | 10/2002 | Brock |
| 6,499,053 B1 | 12/2002 | Marquette |
| 6,505,208 B1 | 1/2003 | Kanevsky |
| 6,509,925 B1 | 1/2003 | Dermler |
| 6,525,731 B1 | 2/2003 | Suits |
| 6,549,933 B1 | 4/2003 | Barrett |
| 6,567,109 B1 | 5/2003 | Todd |
| 6,567,813 B1 | 5/2003 | Zhu |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,765,596 B2 | 7/2004 | Lection |
| 6,781,607 B1 | 8/2004 | Benham |
| 6,819,669 B2 | 11/2004 | Rooney |
| 6,832,239 B1 | 12/2004 | Kraft |
| 6,836,480 B2 | 12/2004 | Basso |
| 6,845,389 B1 | 1/2005 | Sen |
| 6,886,026 B1 | 4/2005 | Hanson |
| 6,948,168 B1 | 9/2005 | Kuprionas |
| RE38,865 E | 11/2005 | Dumarot |
| 6,993,596 B2 | 1/2006 | Hinton |
| 7,006,616 B1 | 2/2006 | Christofferson |
| 7,028,296 B2 | 4/2006 | Irfan |
| 7,062,533 B2 | 6/2006 | Brown |
| 7,143,409 B2 | 11/2006 | Herrero |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |

(56) References Cited

U.S. PATENT DOCUMENTS

| | | |
|---|---|---|
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 2002/0049508 A1* | 4/2002 | Williams ............ A63F 13/12 700/92 |
| 2004/0014514 A1 | 1/2004 | Yacenda |
| 2004/0228291 A1 | 11/2004 | Huslak |
| 2007/0293321 A1* | 12/2007 | Horowitz ............ A63F 13/12 463/42 |
| 2009/0113448 A1 | 4/2009 | Smith |
| 2011/0250971 A1* | 10/2011 | van Os ............ A63F 13/795 463/42 |
| 2013/0274021 A1* | 10/2013 | Novotny ............ A63F 13/12 463/42 |
| 2013/0281193 A1* | 10/2013 | Arnone ............ G07F 17/326 463/25 |
| 2014/0344725 A1 | 11/2014 | Bates |
| 2015/0290531 A1* | 10/2015 | Herz ............ A63F 9/18 434/237 |
| 2016/0054103 A1* | 2/2016 | Macher ............ F41J 3/02 700/92 |
| 2016/0191671 A1 | 6/2016 | Dawson |
| 2016/0206961 A1* | 7/2016 | Taylor ............ A63F 13/795 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |

(56) References Cited

FOREIGN PATENT DOCUMENTS

| | | |
|---|---|---|
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 1207694 A2 | 5/2002 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 2001204973 A | 7/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| KR | 20020038229 A | 5/2002 |
| KR | 20030039019 A | 5/2003 |
| MY | 117864 A | 8/2004 |
| SG | 55396 | 12/1998 |
| TW | 424213 | 3/2001 |
| TW | 527825 | 4/2003 |
| TW | 200836091 | 9/2008 |
| TW | 200937926 | 9/2009 |
| TW | 201002013 | 1/2010 |
| TW | 201009746 | 3/2010 |
| TW | 201024997 | 7/2010 |
| TW | 201028871 | 8/2010 |
| WO | 0203645 A2 | 1/2002 |
| WO | 2002073457 | 9/2002 |
| WO | 20020087156 | 10/2002 |
| WO | 03049459 A1 | 6/2003 |
| WO | 03058518 A2 | 7/2003 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

Supplementary European Search from the European Patent Office for EP05723458.5, dated Jul. 19, 2010.

International Search Report as Published as WO2005/079538 in corresponding international application No. PCT/US2005/005550, dated Jul. 5, 2006.

* cited by examiner

SYSTEM AND METHOD FOR PROVIDING CONTINUOUS GAMEPLAY IN A MULTIPLAYER VIDEO GAME THROUGH AN UNBOUNDED GAMEPLAY SESSION

FIELD OF THE INVENTION

The invention relates generally to video games, and more particularly to a system and method for providing continuous gameplay in a multiplayer video game through an unbounded gameplay session. The unbounded gameplay session may be initiated based on matched players, and may run continuously until all players have exited (or been removed from) the unbounded gameplay session.

BACKGROUND OF THE INVENTION

A multiplayer video game is a video game in which two or more players play in a gameplay session in a cooperative or adversarial relationship. Conventional gameplay sessions for multiplayer video games are typically bounded gameplay sessions that start and end within a given time period. Scoring for these sessions is generally based on achievement of some game objective during the bounded gameplay session (e.g., a number of "kills" in a First-Person-Shooter game).

Unfortunately, some drawbacks associated with bounded gameplay sessions may compromise the player experience. For example, when not enough players are available for a multiplayer gameplay session, those players that have expressed a desire to play may be forced to wait idly until a requisite number of players are obtained. This can be frustrating for players that are eager to play, and may diminish overall enjoyment of the video game.

One solution has been to match (or group) players quickly in an effort to commence a gameplay session without undue delay. Unfortunately, while such matching may allow a gameplay session to start sooner rather than later, it is possible that a group of players may be matched with one or more players that are not good a match, either because of a difference in skill, a poor network connection, or due to other factors, thereby resulting in a sub-optimal and perhaps unsatisfying gameplay session.

Further, once a multiplayer gameplay session has commenced, it is considered socially taboo to quit during the gameplay session because it makes the gameplay session less enjoyable for the remaining players. In a team game, for example, a player that leaves (or quits) early forces one team to finish the game shorthanded, unbalancing the gameplay. The term "rage quitting" is sometimes used in this scenario because it is assumed that leaving a gameplay session prematurely is so rude that someone only does it because he or she is having a temper tantrum. Individual gameplay sessions suffer if there are not enough players to keep the game interesting.

Additionally, because conventional multiplayer gameplay sessions typically end after a predefined time period has elapsed, or after a prescribed game event has occurred (or game objective has been reached), players who are enjoying a gameplay session (or who happen to be on a "hot streak") are nevertheless forced to stop playing when the gameplay session ends. This can be frustrating for a player that may wish to continue playing rather than having his or her momentum stalled because some arbitrary time window has elapsed, or game objective has been reached.

These and other drawbacks exist with discrete, bounded gameplay sessions in multiplayer video games.

SUMMARY OF THE INVENTION

The invention addressing these and other drawbacks relates to a system and method for providing continuous gameplay in a multiplayer video game through an unbounded gameplay session ("UGS").

A UGS may comprise a multiplayer gameplay session initiated based, in certain instances, on matched players that continues until all players have exited (or been removed from) the gameplay session. New players may join a UGS in progress, and existing players may leave a UGS that is still on-going. Players may join, exit, and later rejoin a given UGS at any time. As long as at least a minimum number of players remain in a UGS (whether an original player present when the UGS was initiated, or a new player that later joined the UGS in progress), the UGS may continue indefinitely. In other words, a UGS may terminate only when too few players (below a threshold number of players) remain in the gameplay session.

A UGS differs from a conventional, bounded gameplay session ("BGS") in that a BGS typically terminates after a predefined time period has elapsed, or after a prescribed game event has occurred (or game objective has been reached).

A UGS further differs from a virtual world or Massively Multiplayer Online Game ("MMOG") in that a UGS is not persistent, and will terminate when no (or too few) players remain in the gameplay session. Other differences between a UGS and MMOG include, for example, UGS sessions result from player matchmaking (e.g., players waiting in a game lobby to be matched), a UGS is scored based on a rate, the environment is not persisted beyond a UGS, the environment doesn't change in a material way during the UGS, in-game objects (typically) accumulated during the UGS and are typically not retained beyond the UGS (i.e., a given player may have a fixed load out that stays the same throughout the UGS).

While aspects of the invention may be described herein with reference to various game levels or modes, characters, roles, game items, etc. associated with a "shooter" game, it should be appreciated that any such examples are for illustrative purposes only, and are not intended to be limiting. The system and method described in detail herein may be used in any genre of video game, without limitation.

Further, as used herein, the terms "match" or "matched players" refers to a matching (or grouping) of two or more players, rather than a contest.

According to one implementation of the invention, to initiate a UGS, one or more players that are waiting to be matched may be identified, such as players whose characters are waiting in a virtual game lobby to join a gameplay session. The gameplay session may comprise any type of gameplay session including, without limitation, a real gameplay session and/or a practice gameplay session (e.g., associated with a "practice mode" of a game).

In one implementation, a matchmaking engine may generate one or more matches by grouping two or more of the identified players. The matchmaking engine may use known or hereafter-developed matchmaking techniques to generate a match (e.g., interchangeably referred to herein as "matchmaking") by grouping players in an effort to produce the most satisfying player experiences. In an implementation, the matchmaking engine may alter a given match after the match has been made (e.g., during a given UGS). For instance, the matchmaking engine may alter one or more aspects of gameplay (e.g., number of players, in-game items, etc.) based on changes that occur during the UGS. Such changes can include, without limitation, changes in average skill levels (e.g., one team may be outperforming another team), changes in roles of players (e.g., too many players taking on a sniper role), and/or other changes.

According to an aspect of the invention, once two or more players have been matched, a UGS may be initiated, during which players may be added or removed.

In one implementation, the system may monitor player performance during a UGS. In order to facilitate a UGS in which players may join and exit at any time, and which can be continuous, player performance may be monitored based on various time-based (or other) parameters. For instance, in a conventional BGS that spans a fixed time period (e.g., ten minutes), each player's score (based on achievement of some game objective) may be recorded. The player with the highest score may be judged to be the best player during the BGS because each player has played exactly ten minutes. In a UGS, however, reliance on a "highest score" alone may not likely be accurate, as some players may have participated in the UGS longer than other players.

Accordingly, in one implementation, a player's score may include a temporal aspect in the form of a time-based parameter. A time-based parameter may, for example, comprise a rate (e.g., a performance per unit of time), an interval (e.g., a performance within a given time period), or other time-based parameter.

As an example, in a First-Person-Shooter game, a player's score may be based (in whole or in part) on a rate of number of "kills" per minute (e.g., averaged over a given time window such as five minutes of play), a number of kills during a given interval (e.g., in the last five minutes), or using some other time-based parameter. In this manner, a fair scoring system is provided for players who may have been playing longer than other players in the UGS. Further, even if a UGS has been going on for hours as various players have come and gone, this type of "score trending" allows a given player to see how well he or she is doing (or others), just a short time after commencing gameplay. This can also be beneficial even in discrete BGSs that might last for a long time (e.g., that may take 30 minutes or more to play), as players may want to know who is performing well in a recent time period (e.g., in the past 5 minutes).

Alternatively or additionally, other types of parameters may be used to score players. For instance, player performance may be tracked when different types of in-game items (e.g., weapons, clothing, accessories, etc.) are used. Continuing with the First-Person-Shooter video game example above, a player may wish to know that he or she is averaging more kills per minute with a new weapon, suggesting that this weapon may be more effective for the player going forward.

According to an aspect of the invention, the performance of one or more players or a team of players may be monitored to determine whether an uneven match is being played in a given UGS based on the monitored performance. For example, a performance gap may be determined between a first team of players matched against a second team of players. The performance gap may be determined by comparing a performance of the first team (e.g., number of kills by the first team) with the performance of the second team (e.g., number of kills by the second team). Based on the comparison, it may be determined that the first team is outperforming the second team to an extent that gameplay may no longer be enjoyable (by either or both teams). In these instances, an adjustment feature may be implemented for the first team and/or the second team. For example, the adjustment feature may include an advantage, such as an additional player, given to the second team and/or a disadvantage, such as removal of a number of kills, to the first team. Because a UGS allows players to be added even after the gameplay session has been initiated, the system may reduce instances of lopsided gameplay (which may be undesirable to either or both teams) by adding a new player to a losing team, giving the losing team an advantage, or facilitate uneven matches to discourage wars of attrition.

By providing a UGS, the system facilitates various advantages. For instance, the system enables better matchmaking for gameplay sessions by allowing adjustments to matches between players to be made even after a given gameplay session has been initiated.

Furthermore, by facilitating a UGS, the system allows players to freely join and quit gameplay sessions without social ramifications of quitting a gameplay session. For instance, it is often frowned upon to quit a gameplay session because it may leave a team disadvantaged with respect to an opposing team who has a full complement of players. Because the system allows players to join and exit a UGS, such a disadvantage on the team losing a player may be mitigated by replacing a quitting player with a new player.

Because of the scoring mechanism of the UGS, scoring may remain fair and indicative of a player's performance while accounting for new players and players who quit a UGS. Moreover, the system facilitates better matchmaking by correcting mismatches during a UGS. For instance, by providing an adjustment feature during a UGS (e.g., adding a player to a losing team), the system may adjust gameplay according to particular needs after a given gameplay session has been initiated (e.g., to create more fair gameplay, achieve a certain level of lopsidedness, etc.). As would be appreciated, multiple corrections may be made during a given UGS. For example, a first team may be provided with an advantage over a competing second team and the second team may later be provided with an advantage over the first team.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention described herein relates to a system and method for providing continuous gameplay in a multiplayer video game through an UGS. The UGS may be initiated based on matched players, and may run continuously until all players have exited (or been removed from) the UGS.

Exemplary System Architecture

Figure 1A:
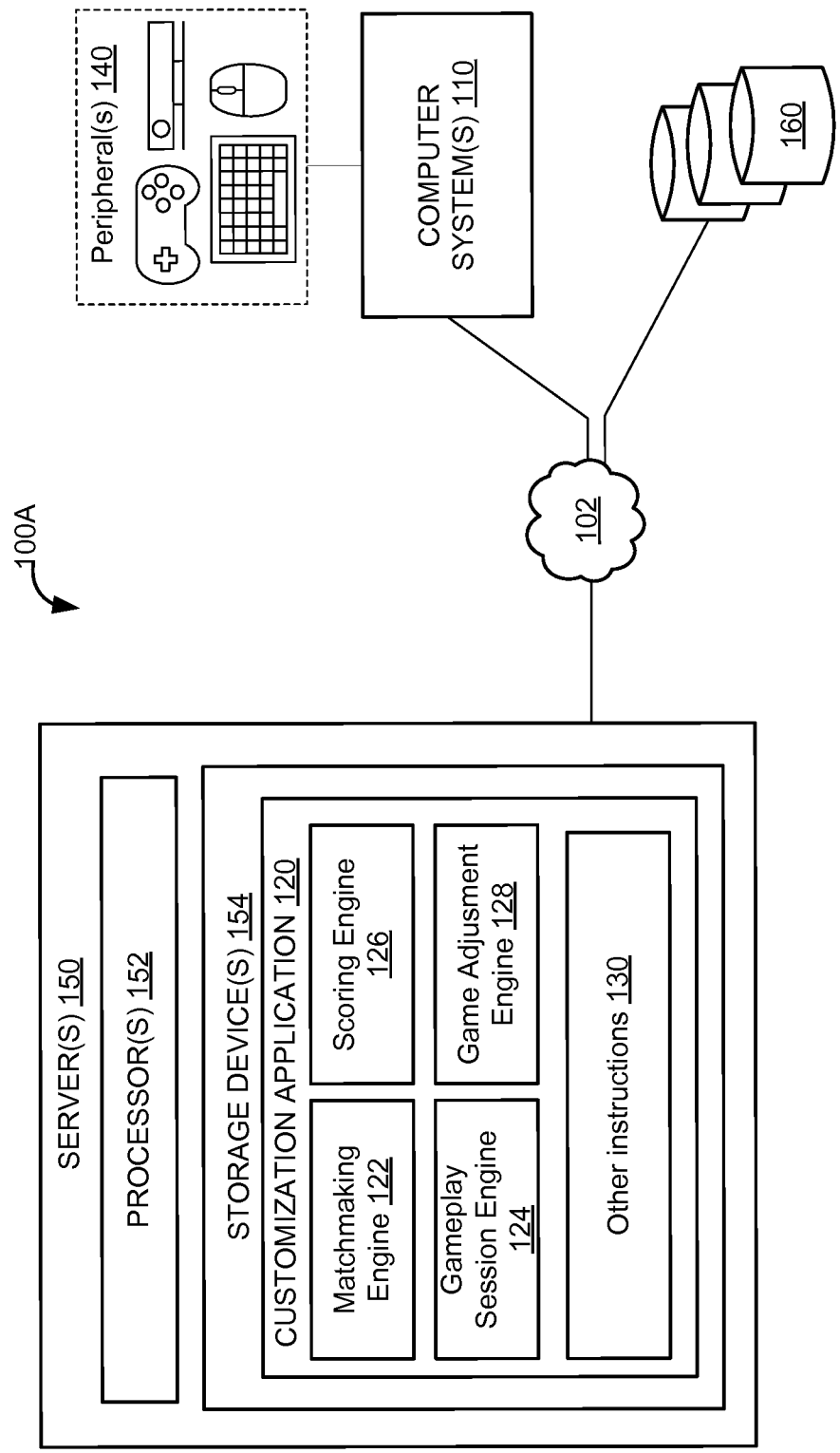
FIG. 1A illustrates an exemplary system for providing continuous gameplay in a multiplayer video game through an UGS, according to an implementation of the invention.
Figure 1B:
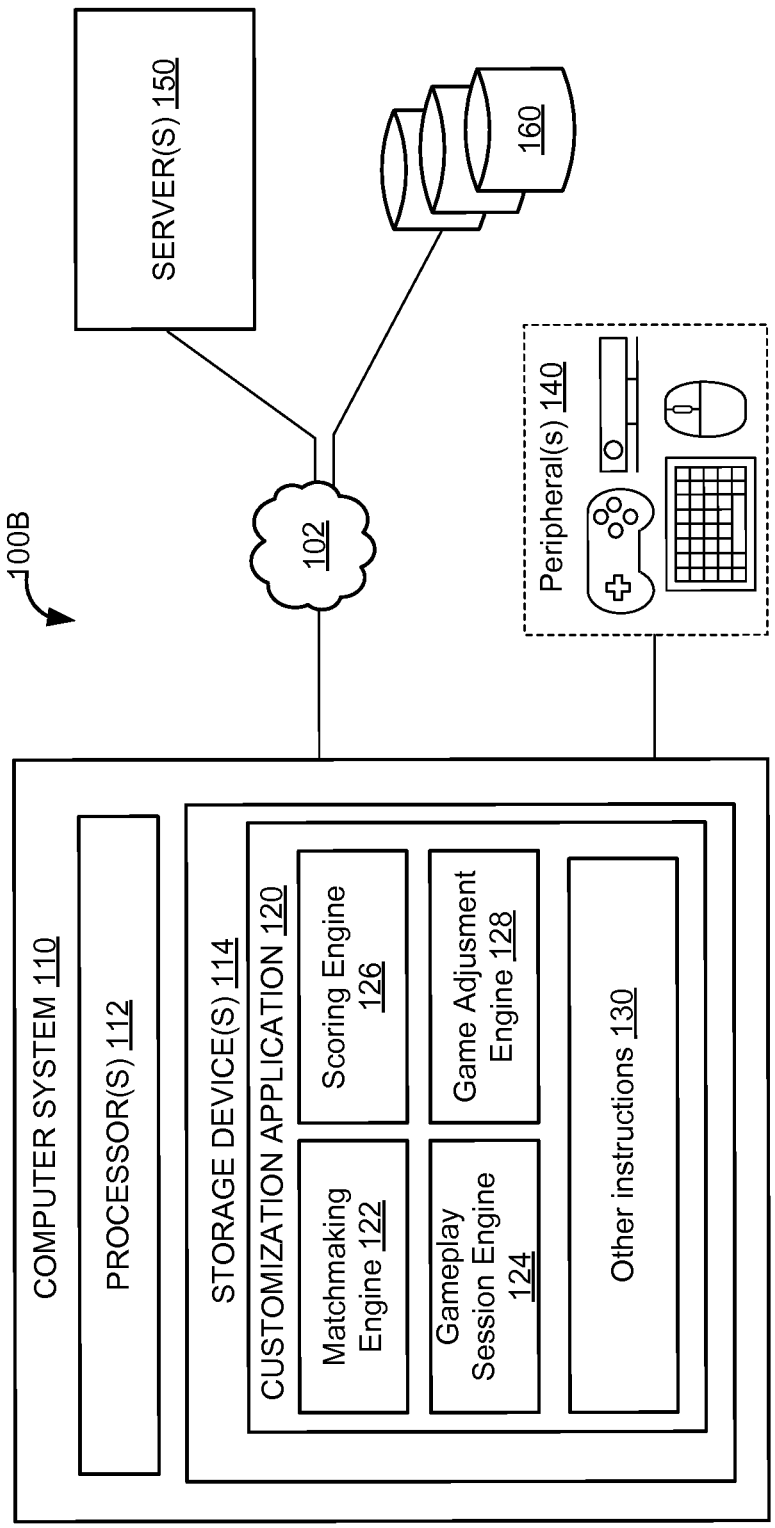
FIG. 1B illustrates an exemplary system for providing continuous gameplay in a multiplayer video game through an UGS, according to an implementation of the invention.

FIGS. 1A and 1B each depict an exemplary architecture of a system which may include one or more computer systems 110, one or more servers 150, one or more databases 160, and/or other components. FIG. 1A illustrates an implementation in which server(s) 150 function as a host computer that hosts gameplay between other devices, such as computer system(s) 110. FIG. 1B illustrates an implementation in which a given computer system 110 functions as a host computer that hosts gameplay between (or with) other devices, such as other computer system(s) 110. Unless specifically stated otherwise, the description of various system components may refer to either or both of FIGS. 1A and 1B.

Computer System 110

Computer system 110 may be configured as a gaming console, a handheld gaming device, a personal computer (e.g., a desktop computer, a laptop computer, etc.), a smartphone, a tablet computing device, and/or other device that can be used to interact with an instance of a video game.

Referring to FIG. 1B, computer system 110 may include one or more processors 112 (also interchangeably referred to herein as processors 112, processor(s) 112, or processor 112 for convenience), one or more storage devices 114 (which may store an unbounded gameplay application 120), one or more peripherals 140, and/or other components. Processors 112 may be programmed by one or more computer program instructions. For example, processors 112 may be programmed by unbounded gameplay application 120 and/or other instructions (such as gaming instructions used to instantiate the game).

Depending on the system configuration, unbounded gameplay application 120 (or portions thereof) may be part of a game application, which creates a game instance to facilitate gameplay. Alternatively or additionally, unbounded gameplay application 120 may run on a device such as a server 150.

Unbounded gameplay application 120 may include instructions that program computer system 110. The instructions may include, without limitation, a matchmaking engine 122, a gameplay session engine 124, a scoring engine 126, a game adjustment engine 128, and/or other instructions 130 that program computer system 110 to perform various operations, each of which are described in greater detail herein. As used herein, for convenience, the various instructions will be described as performing an operation, when, in fact, the various instructions program the processors 112 (and therefore computer system 110) to perform the operation.

Peripherals 140

Peripherals 140 may be used to obtain an input (e.g., direct input, measured input, etc.) from a player. Peripherals 140 may include, without limitation, a game controller, a gamepad, a keyboard, a mouse, an imaging device such as a camera, a motion sensing device, a light sensor, a biometric sensor, and/or other peripheral device that can obtain an input from a player. Peripherals 140 may be coupled to a corresponding computer system 110 via a wired and/or wireless connection.

Server 150

Server 150 may include one or more computing devices. Referring to FIG. 1A, Server 150 may include one or more physical processors 152 (also interchangeably referred to herein as processors 152, processor(s) 152, or processor 152 for convenience) programmed by computer program instructions, one or more storage devices 154 (which may store a customization application 120), and/or other components. Processors 152 may be programmed by one or more computer program instructions. For example, processors 152 may be programmed by gaming instructions used to instantiate the game.

Depending on the system configuration, customization application 120 (or portions thereof) may be part of a game application, which creates a game instance to facilitate gameplay. Alternatively or additionally, portions or all of customization application 120 may run on computer system 110 or server 150.

Customization application 120 may include instructions that program server 150. The instructions may include, without limitation, a scoring engine 122, an analytics and feedback engine 124, a pipelining engine 126, a microtransaction engine 128, a User Interface ("UI") engine 130, and/or other instructions that program server 150 to perform various operations, each of which are described in greater detail herein.

As used herein, for convenience, the various instructions will be described as performing an operation, when, in fact, the various instructions program the processors 152 (and therefore server 150) to perform the operation.

Although illustrated in FIG. 1 as a single component, computer system 110 and server 150 may each include a plurality of individual components (e.g., computer devices) each programmed with at least some of the functions described herein. In this manner, some components of computer system 110 and/or server 150 may perform some functions while other components may perform other functions, as would be appreciated. Thus, either or both server 150 and computer system 100 may function as a host computer programmed by customization application 120. The one or more processors (112, 152) may each include one or more physical processors that are programmed by computer program instructions. The various instructions described herein are exemplary only. Other configurations and numbers of instructions may be used, so long as the processor(s) (112, 152) are programmed to perform the functions described herein.

Furthermore, it should be appreciated that although the various instructions are illustrated in FIG. 1 as being co-located within a single processing unit, in implementations in which processor(s) (112, 152) includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) (112, 152) may be programmed by one or more additional instructions that may perform some or all of the functionality attributed herein to one of the instructions.

Storage Devices 114

The various instructions described herein may be stored in one or more storage devices, such as storage device (114, 154). Storage device (114, 154) may comprise random access memory (RAM), read only memory (ROM), and/or other memory. The storage device may store the computer program instructions (e.g., the aforementioned instructions) to be executed by processor (112, 152) as well as data that may be manipulated by processor (112, 152). The storage device may comprise floppy disks, hard disks, optical disks, tapes, or other storage media for storing computer-executable instructions and/or data.

Network 102

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

In FIG. 1, as well as in other drawing Figures, different numbers of entities than those depicted may be used. Furthermore, according to various implementations, the components described herein may be implemented in hardware and/or software that configure hardware.

Databases 160

The various databases 160 described herein may be, include, or interface to, for example, an Oracle™ relational database sold commercially by Oracle Corporation, Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The foregoing system architecture is exemplary only and should not be viewed as limiting. Other system configurations may be used as well, as would be appreciated by those having skill in the art.

Exemplary Multiplayer System Configurations

Multiplayer video games have exploded in popularity due, in part, to services such as Microsoft's Xbox LIVE® and Sony's PlayStation Network® which enable gamers all over the world to play with or against one another. Generally, as noted above, a multiplayer video game is a video game in which two or more players play in a gameplay session in a cooperative or adversarial relationship. Typically, when a player logs in to a game system or platform to play a multiplayer video game, the player may engage in a gameplay session in which he or she is matched with other players to play together (on the same team or as opponents).

Figure 2A:
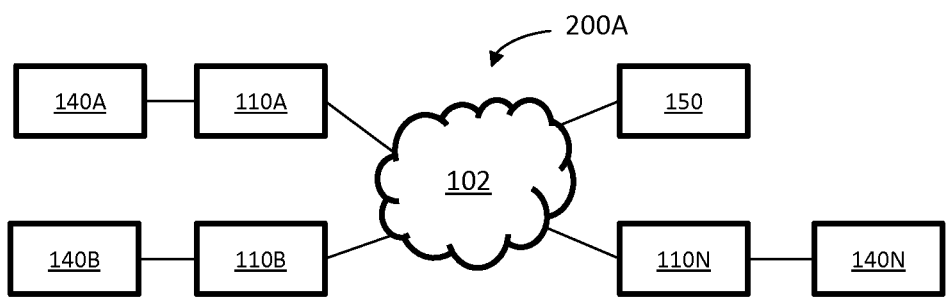
FIG. 2A illustrates an exemplary system configuration in which a server hosts a plurality of computer devices to facilitate a multiplayer game, according to an implementation of the invention.

FIG. 2A illustrates an exemplary system configuration 200A in which a server hosts a plurality of computer devices to facilitate a multiplayer game, according to an implementation of the invention. In one implementation, one or more servers 150 may host a number of computer systems 110 (illustrated as computer systems 110A, 110B, . . . , 110N) via a network 102. Each computer system 110 may include one or more peripherals (illustrated as peripherals 140A, 140B, . . . , 140N). In this manner, one or more servers 150 may facilitate the gameplay of different players using different computer systems 110 and/or otherwise provide one or more operations of unbounded gameplay application 120 (illustrated in FIG. 1).

In some instances, a given server 150 may be associated with a proprietary gameplay network system, such as, without limitation, Microsoft's Xbox LIVE® and Sony's PlayStation Network®, and/or another type of gameplay network system. In this implementation, a given computer system 110 may be associated with a particular type of gaming console. Other types of computer systems 110 using other types of gameplay networks may be used as well.

Figure 2B:
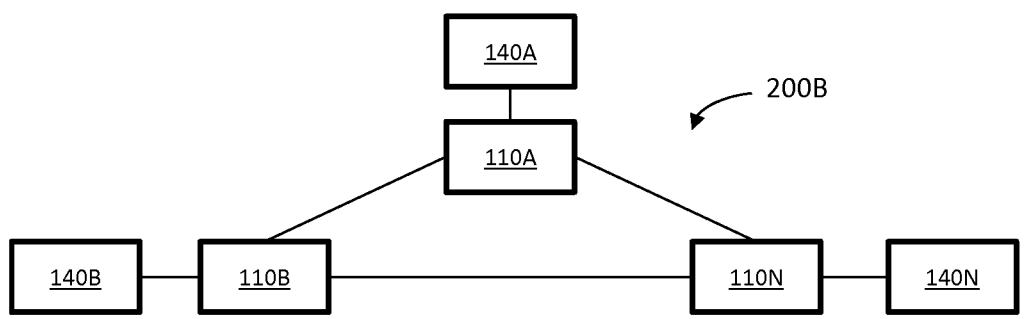
FIG. 2B illustrates an exemplary system configuration in which a plurality of networked servers communicate with one another to facilitate a multiplayer game, according to an implementation of the invention.

FIG. 2B illustrates an exemplary system configuration 200B in which a plurality of computer systems 110 are networked together to facilitate a multiplayer game, according to an implementation of the invention. Any one or more of the computer devices 110 may serve as a host and/or otherwise provide one or more operations of unbounded gameplay application 120 (illustrated in FIG. 1).

Figure 2C:
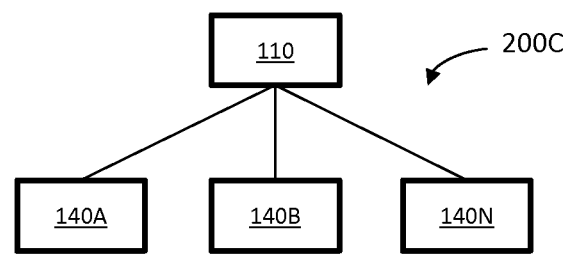
FIG. 2C illustrates an exemplary system configuration in which a plurality of computer devices are networked together to facilitate a multiplayer game, according to an implementation of the invention.

FIG. 2C illustrates an exemplary system configuration 200C in which a computer system 110 is used by a plurality of users to facilitate a multiplayer game, according to an implementation of the invention. In an implementation, computer system 110 may be considered to host the multiplayer game and/or otherwise provide one or more operations of unbounded gameplay application 120 (illustrated in FIG. 1).

Referring to FIGS. 2A-2C, in an implementation, a host may facilitate the multiplayer game and/or perform other operations described herein. In an implementation, at least some of these operations may also or instead be performed by an individual computer system 110. Furthermore, the illustrated system configurations are exemplary only and should not be viewed as limiting in any way. Other system configurations may be used as well, as would be appreciated by those having skill in the art.

Unbounded Gameplay Session ("UGS")

According to an aspect of the invention, to initiate a UGS, one or more players that are waiting to be matched may be identified, such as players whose characters are waiting in a virtual game lobby to join a gameplay session. The gameplay session may comprise any type of gameplay session including, without limitation, a real gameplay session and/or a practice gameplay session (e.g., associated with a "practice mode" of a game).

Matchmaking Engine 122

In one implementation, matchmaking engine 122 may generate one or more matches by grouping two or more of the identified players (either in an adversarial or cooperative capacity). The two or more players or may have elected to play together, or may be matched by matchmaking engine 122.

In one example, players may be matched (based on one or more matchmaking factors) to play on a team against an opposing team. The opposing team may comprise a number of players who have likewise been similarly matched based on one or more matchmaking factors, a team of non-player characters, or a combination thereof. The matchmaking factors may indicate a compatibility of the matched players to provide for satisfying gameplay experience. For example, and without limitation, players may be matched based on a player skill level, a player style, a player preference to play with certain players, and/or other matchmaking factors. The matchmaking engine may use known or hereafter-developed matchmaking techniques to generate a match (e.g., interchangeably referred to herein as "matchmaking") by grouping players in an effort to produce the most satisfying player experiences.

Gameplay Session Engine 124

According to an aspect of the invention, once two or more players have been matched, gameplay session engine 124 may initiate a UGS. Once the UGS has been initiated, gameplay session engine 124 may add and/or remove players from the UGS. For instance, players may choose to exit (and later rejoin) a given UGS. New players may join (then later exit and rejoin) a given UGS. In this manner, even though a given UGS is a gameplay session that may have been initiated with a selection of original players, the set of players participating in a UGS may change over time. A given UGS may therefore continue indefinitely as long as at least one player wishes to continue to gameplay. When all players have exited (or been removed from) a UGS or otherwise when a number of players remaining falls below a threshold number of players, gameplay session engine 124 may terminate the UGS. The threshold number of players may be two such that the UGS is terminated when the session is no longer a player-versus-player session. As would be appreciated, other threshold number of players (including zero) may be used as well.

In some implementations of the invention, gameplay session engine 124 may determine whether to initiate a UGS or a BGS based on game logic, or a player selection (e.g., a player may elect to join either a UGS or a BGS). Alternatively or additionally, different game lobbies in which players wait to be matched may correspond to different types of gameplay sessions. For example, a first game lobby may serve as a waiting area to enter a UGS game, while a second game lobby may serve as a waiting area to enter a BGS game.

In an implementation, gameplay session engine 124 may initiate a BGS and, upon occurrence of a terminating condition (e.g., passage of an elapsed time or achievement of a game objective) or at some time during the BGS, query the players participating in the BGS whether an extension of the BGS is desired. In other words, players involved in a BGS may elect to extend gameplay. Such extension may be for an additional amount of time (e.g., an additional five minutes of gameplay) and/or achievement of an additional game objective (e.g., additional fifty kills). Upon passage of the additional amount of time and/or achievement of the additional game objective, the extended BGS may be further extended by the same or different amount of time/additional game objective or may terminate if no further extensions are desired. Any player electing to extend gameplay may continue to play, while other players not electing to extend gameplay may exit the BGS (e.g., when the BGS would normally terminate).

In some instances, gameplay session engine 124 may convert a BGS into a UGS. For example, gameplay session engine 124 may query the players involved in a BGS whether conversion to a UGS is desired. If all (or a predetermined number of) players agree, the BGS may be converted to a UGS immediately. If only a subset of the players agree, the BGS may be converted to a UGS when the BGS would have normally terminated. Upon normal termination of the BGS, the subset of players that have elected to convert to a UGS may continue gameplay in the UGS (and any scoring from the BGS may be carried over to the UGS), while those not electing to convert to a UGS may simply exit the BGS. The converted BGS-to-UGS may continue indefinitely until no more players remain in the gameplay session. If none of the players agree, gameplay session engine 124 may not convert the BGS to a UGS.

In an implementation, gameplay session engine 124 may provide a UGS or extend a BGS by, for example and without limitation, extending a game map, such as disclosed in co-pending, and concurrently filed, U.S. patent application Ser. No. 14/712,417, entitled "System and Method for Providing Dynamically Variable Maps in a Video Game", which is hereby incorporated by reference herein in its entirety.

Scoring Engine 126

According to an aspect of the invention, scoring engine 126 may monitor player performance during a UGS. In order to facilitate a UGS in which players may join and exit at any time, and which can be continuous, scoring engine 126 may monitor player performance based on various time-based (or other) parameters. Such time-based (or other) parameters may enable a player to be scored in a manner that is not dependent on a total length of time in which the player played during a UGS (e.g., whether the player was an original player, a new player, or a player that previously exited and rejoined a UGS).

For instance, in a conventional BGS that spans a fixed time period (e.g., ten minutes), each player's score (based on achievement of some game objective) may be recorded. The player with the highest score may be judged to be the best player during the BGS because each player has played exactly ten minutes. In a UGS, however, reliance on a "highest score" alone may not likely be accurate, as some players may have participated in the UGS longer than other players.

Accordingly, in one implementation, a player's score may include a temporal aspect in the form of a time-based parameter. A time-based parameter may, for example, comprise a rate (e.g., a performance per unit of time), an interval (e.g., a performance within the last five minutes), or other time-based parameter.

As an example, in a First-Person-Shooter game, a player's score may be based (in whole or in part) on a rate of number of "kills" per minute (e.g., averaged over a given time window such as five minutes of play), a number of kills during a given interval (e.g., in the last five minutes), or using some other time-based parameter. In this manner, a fair scoring system is provided for players who may have been playing longer than other players in the UGS. Further, even if a UGS has been going on for hours as various players have come and gone, this type of "score trending" allows a given player to see how well he or she is doing (or others), just a short time after commencing gameplay. This can also be beneficial even in discrete, BGSs that might last for a long time (e.g., that may take 30 minutes or more to play), as players may want to know who is performing well in a recent time period (e.g., in the past 5 minutes).

Alternatively or additionally, scoring engine 126 may use other types of parameters to score players. For instance, scoring engine 126 may track a player's performance when different types of in-game items (e.g., weapons, clothing, accessories, etc.) are used. Continuing with the First-Person-Shooter video game example above, a player may wish to know that he or she is averaging more per kills per minute with a new weapon, suggesting that this weapon may be more effective for the player going forward.

In some instances, scoring engine 126 may track a player's performance based on the player's play style. For example, scoring engine 126 may determine a number of kills made by the player (whether through the entire UGS or portions thereof) while the player is playing in a "run-and-gun," a "camping and sniping," and/or other play styles. In this manner, scoring engine 126 allows a player or others to analyze which play styles are most effective for that player.

In some instances, scoring engine 126 may track a player's performance based on the makeup of teammates and/or foes. For instance, scoring engine 126 may measure a player's performance based on a skill level, a played role, a play style, and/or other characteristic of a teammate (and/or foe) during a UGS. In this manner, scoring engine 126 allows a player or others to analyze which teammates should be sought when playing future games (and/or which foes should be avoided if possible).

Whether using a time-based or other parameter, scoring engine 126 may keep track of all the scores for a given UGS. For example, after a UGS has terminated, scoring engine 126 may rank players according to their scores. For instance, scoring engine 126 may rank players according to their number of kills per minute, highest number of kills in a given playing time window (e.g., any five minutes of playing time), highest number of kills per given weapon, highest number of kills per type of play style, and/or other score generated by scoring engine 126. During a UGS, scoring engine 126 may provide real-time scores to players. For instance, a newly added player may obtain (e.g., by depressing a user interface member on peripheral 140 to request scores) his number of kills since joining the UGS (e.g., his score within the past five minutes). In some instances, a comparison of player scores during a UGS may be provided. For instance, a given player may be provided with a comparison of that player's score during a UGS with one or more other players' scores during the UGS. Other players may be provided with similar comparisons. As would be appreciated, the score comparison may related to a team of players as well (e.g., a comparison of team scores may be provided to one or all members of either or both teams).

Figure 6A:
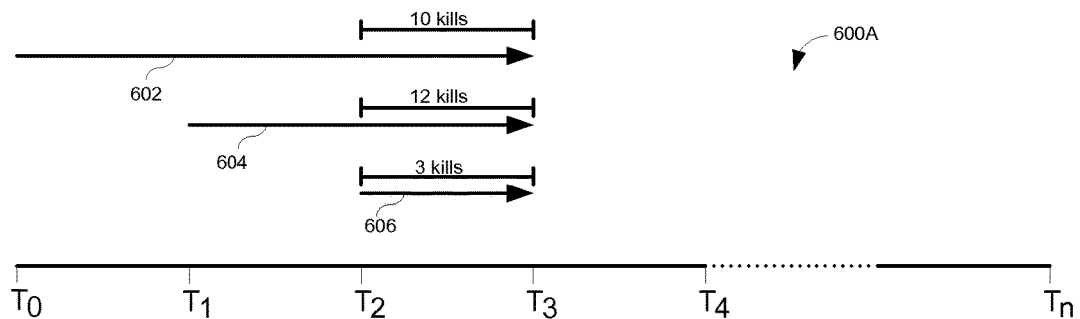
FIG. 6A illustrates a diagram that depicts an exemplary first scoring mechanism using a time-based parameter, according to an implementation of the invention.
Figure 6B:
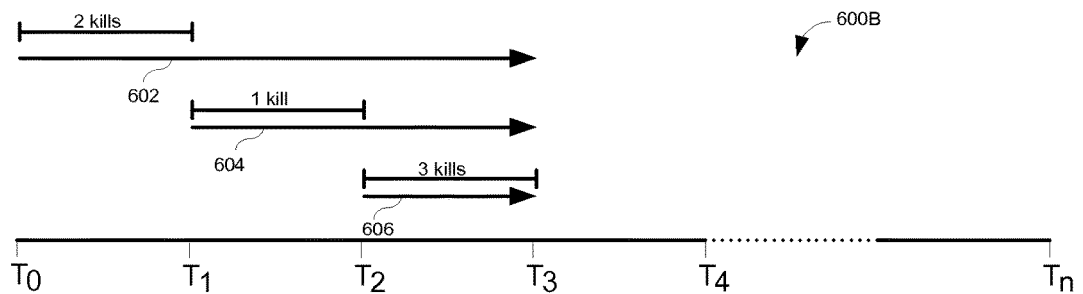
FIG. 6B illustrates a diagram that depicts an exemplary second scoring mechanism using a time-based parameter, according to an implementation of the invention.
Figure 6C:
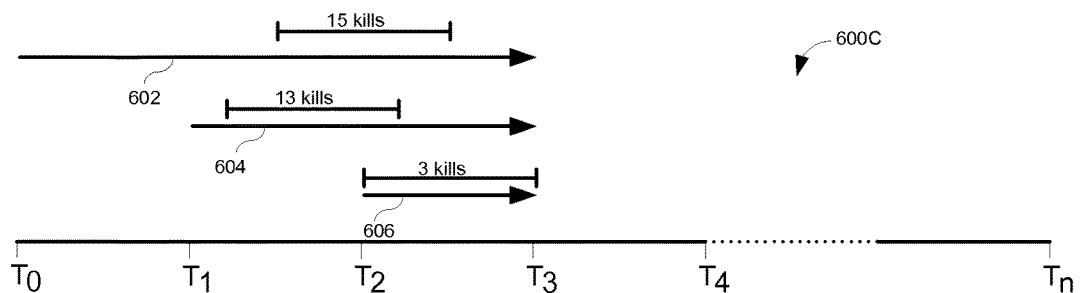
FIG. 6C illustrates a diagram that depicts an exemplary third scoring mechanism using a time-based parameter, according to an implementation of the invention.

Each of FIGS. 6A, 6B, and 6C depict a gameplay session that begins at time $T_0$ and terminates at time $T_n$. Each of FIGS. 6A, 6B, and 6C also depicts a player 602 that started participating in the depicted gameplay session at time $T_0$, a player 604 that started participating in the depicted gameplay session at time $T_1$ (i.e., after the gameplay session was initiated), and a player 606 that started participating in the depicted gameplay session at time $T_2$ (collectively referred to as "participating players"). FIGS. 6A, 6B, and 6C are used to illustrate various scoring mechanisms, which may be used by scoring engine 126 to monitor a player's performance and generate a score for the player based on the monitored performance.

For instance, FIG. 6A illustrates a diagram 600A that depicts an exemplary first scoring mechanism using a time-based parameter, according to an implementation of the invention. According to the first scoring mechanism depicted in FIG. 6A, each of the participating players may be scored based on an interval of time that begins at the same time for each player (illustrated as time $T_2$) and ends at the same time for each player (illustrated as time $T_3$) (e.g., within the last five minutes). In this manner each of the players may be scored using a common time-based parameter that allows an assessment of a player's performance with respect to other players and without respect to a total length of time that a given player has participated in a gameplay session. For instance, as illustrated, in the last n-minutes (or other time) of gameplay, player 602 has 10 kills, player 604 has 12 kills and player 606 has 3 kills. By this metric, player 604 has the "best" score within the last n-minutes.

FIG. 6B illustrates a diagram 600B that depicts an exemplary second scoring mechanism using a time-based parameter, according to an implementation of the invention. According to the second scoring mechanism depicted in FIG. 6B, each of the participating players may be scored based on a common time-based characteristic, but based on player performance beginning at different times and ending at different times during the gameplay session. For instance, each of the participating players may be scored based on their respective first n-minutes of gameplay. This may allow for a common (and fair) scoring mechanism in which each player is scored by a metric that is common to all participating players. In particular, if a player 606 has been participating in the gameplay session for only two minutes, a score based on a performance of each of the players' first two minutes of gameplay may be generated for each player. For instance, as illustrated, player 602 had 2 kills in his first two minutes of gameplay, player 604 had 1 kill in his first two minutes of gameplay, and player 606 had 3 kills during his first two minutes of gameplay. According to this metric, player 606 has the "best" score.

FIG. 6C illustrates a diagram 600C that depicts an exemplary third scoring mechanism using a time-based parameter, according to an implementation of the invention. According to the third scoring mechanism depicted in FIG. 6C, each of the participating players may be scored based on a sliding time interval that is used to identify a "best" performance over a time interval for each player. For instance, a given time interval (e.g., 2 minutes, 5 minutes, etc.) may be selected (by the system and/or by players) to use to determine the best performance of each player over the selected time interval. In some instances, the given time interval may be no less than an amount of time that a given player has been participating in the gameplay session. In this manner, each player is guaranteed to have participated in the gameplay session for a duration that is equal to or greater than the selected time interval. When the time interval has been selected, the system may analyze the performance of each player over the sliding time interval to identify an interval in which the player achieved the highest performance. For instance, as illustrated, player 602's best performance of 15 kills occurred between time $T_1$ and $T_3$, player 604's best performance of 13 kills occurred between time $T_1$ and $T_3$, and player 606's best performance of 3 kills occurred between time $T_2$ and $T_3$. By this scoring metric, player 602 has the "best" score.

In some implementations, the system may normalize a given score based on a number of players participating at a relevant time. For instance, if ten players were participating during the first two minutes of player 602's gameplay, but only five player were participating during the first two minutes of player 604's gameplay, player 602 may have an advantage because there are more players during his first two minutes of gameplay (and therefore potentially more targets for which to obtain kills) than for player 604. To account for such an advantage, the system may normalize each player's score based on a number of participating players. For instance, the system may generate a ratio by dividing the player's score by the number of participating players to obtain a ratio of score-to-player. Other ways to normalize a score based on number of participating players may be used as well.

The scoring mechanisms illustrated in FIGS. 6A, 6B, and 6C may be used to create separate scores for each player. In other words, a player's performance may be assessed using two or more of the scores illustrated in FIGS. 6A, 6B, and 6C. Furthermore, the various scores illustrated in FIGS. 6A, 6B, and 6C may be used to generate a composite score, in which each individual score may be weighted. Furthermore, the types of scoring mechanisms used to generate one or more scores for a given gameplay session may be selectable by a user at the onset of gameplay, determined on-demand during gameplay, generated after a gameplay session has been terminated, and/or at other times.

The scoring mechanisms illustrated in FIGS. 6A, 6B, and 6C may facilitate a UGS in which players may join and exit at any time, and which can be continuous. This is because such scoring mechanisms may be based on factors other than a total length of time that a given player has participated in a gameplay session. Thus, players may join, leave, and rejoin a gameplay session, while being scored in a manner that allows comparison to other players (who may have been participating in the gameplay session for a longer or shorter duration than a given player).

One or more of the scoring mechanisms illustrated in FIGS. 6A, 6B, and 6C may also be used to monitor and gauge player performance for other types of gameplay sessions (e.g., a BGS or continuous gameplay session) as well.

Game Adjustment Engine 128

In an implementation, game adjustment engine 128 may monitor gameplay of a UGS (e.g., the performance of players or team of players or other characteristic of the UGS) to determine whether an adjustment associated with the UGS should be made. Such determination may be made based on an objective of the UGS (which may be a default objective set by a game developer or others and/or configurable). The objective may be to create an even match (e.g., in some instances to prevent lopsided matches), create an uneven match (e.g., in some instances to prevent a war of attrition), or other objectives.

To determine whether an objective is being achieved, game adjustment engine 128 may determine a performance gap between a first team of players matched against a second team of players. The performance gap may be determined by comparing a performance of the first team (e.g., number of kills by the first team) with the performance of the second team (e.g., number of kills by the second team). Based on the comparison, game adjustment engine 128 may determine whether the first team is outperforming the second team. For objectives associated with creating even gameplay, to an extent that gameplay may no longer be enjoyable (by either or both teams) game adjustment engine 128 may implement an adjustment feature for the first team and/or the second team. For example, the adjustment feature may include an advantage, such as an additional player, given to the second (losing team) and/or a disadvantage, such as reducing the effectiveness of equipment or providing fewer resources on parts of the map, to the first (winning) team. Because a UGS allows players to be added even after the gameplay session has been initiated, the system may reduce instances of lopsided gameplay (which may be undesirable to either or both teams) by adding a new player to a losing team, giving the losing team an advantage.

In some instances, game adjustment engine 128 may implement the adjustment feature only when the performance gap exceeds a predetermined threshold, which may be set by a game designer and/or set by the players themselves before entering the UGS. The performance gap may be specified in terms of absolute metrics (e.g., when a first team's kill count is greater than a second team's kill count by 50 or more) and/or relative metrics (e.g., when a first team has 125% of the number of kills as the second team).

For objectives associated with creating an uneven match, game adjustment engine 128 may implement an adjustment feature when the performance gap is too small (e.g., when the performance gap is at or below a second predetermined (and/or configurable) threshold. In this manner, uneven gameplay may be encouraged, which may lead to an increased performance gap. Game adjustment engine 128 may periodically iterate the adjustments until the performance gap is sufficiently large (e.g., meets or exceeds the second predetermined threshold).

Game adjustment engine 128 may implement various types adjustment features, which may include advantages to a one team and/or disadvantages to another team. For example, and without limitation, an advantage may include adding a new player to a team, replacing a poor-performing player with a new player, providing a virtual item to a team, providing a power-up to a team, providing a positive handicap (e.g., adding a number of kills), and/or providing other benefits to a given team. A disadvantage may include, without limitation, removing a player from the other team, replacing a high-performing player with a new player, removing a virtual item from the other team, removing a power-up from the other team, providing a negative handicap (e.g., subtracting a number of kills), and/or providing other detriment to the other team. An advantage and/or disadvantage may be applied permanently throughout the entire UGS, may be applied temporarily for a predefined time, or may be applied temporarily until the performance gap no longer exists (for objectives associated with even gameplay) or until the performance gap is sufficiently large (for objectives associated with uneven gameplay).

Game adjustment engine 128 may implement such advantages and/or disadvantages periodically throughout the UGS (e.g., each time the performance gap exceeds a predetermined threshold) or on a one-time basis. In an implementation, the adjustment feature provided by game adjustment engine 128 may be controlled by a default setting (e.g., either default on or default off), which may be adjusted by players so they can choose whether to activate (or deactivate) this feature.

Exemplary Flowcharts

Figure 3:
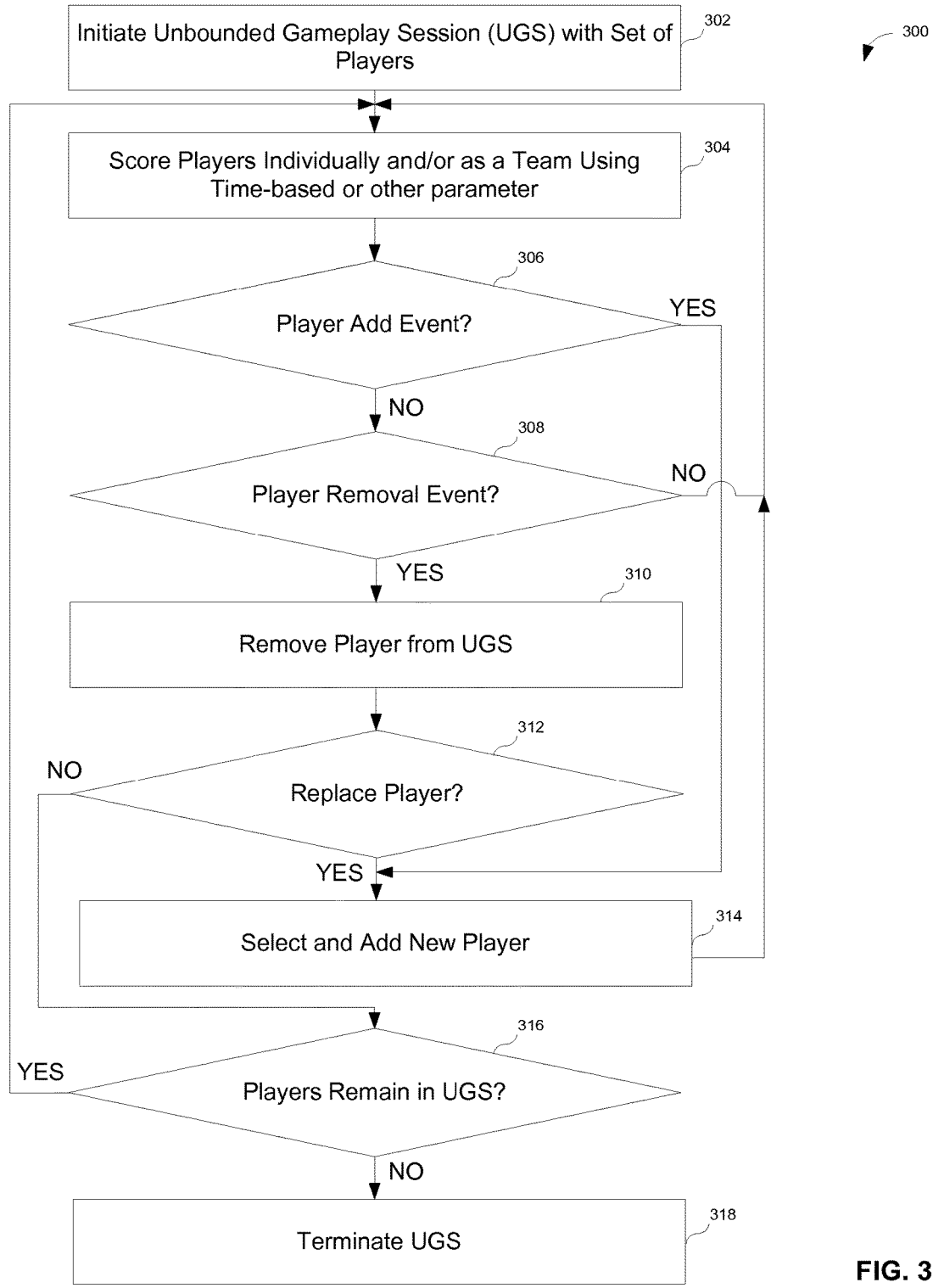
FIG. 3 depicts an exemplary process for providing continuous gameplay in a multiplayer video game through an UGS, according to an implementation of the invention.
Figure 4:
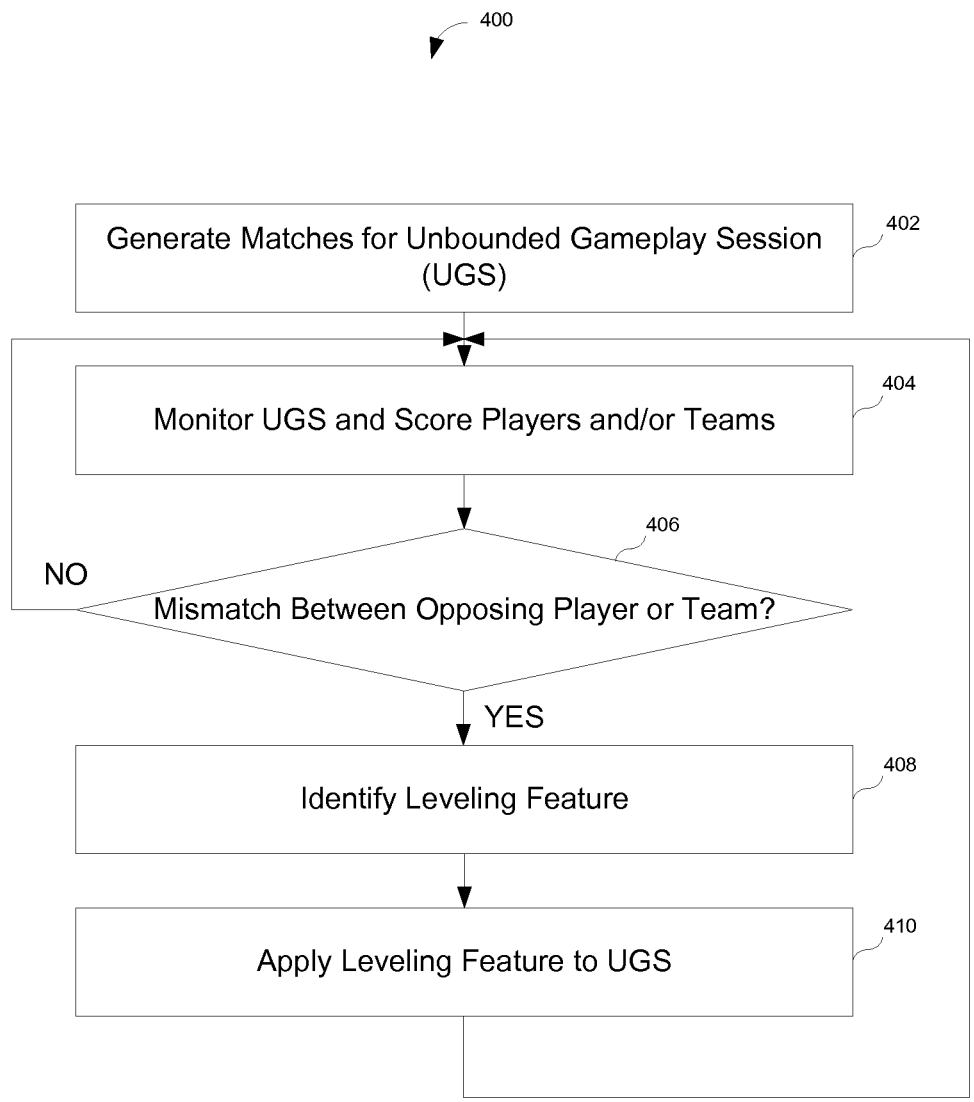
FIG. 4 depicts an exemplary process for providing an adjustment feature to players in a mismatched gameplay session, according to an implementation of the invention.
Figure 5:
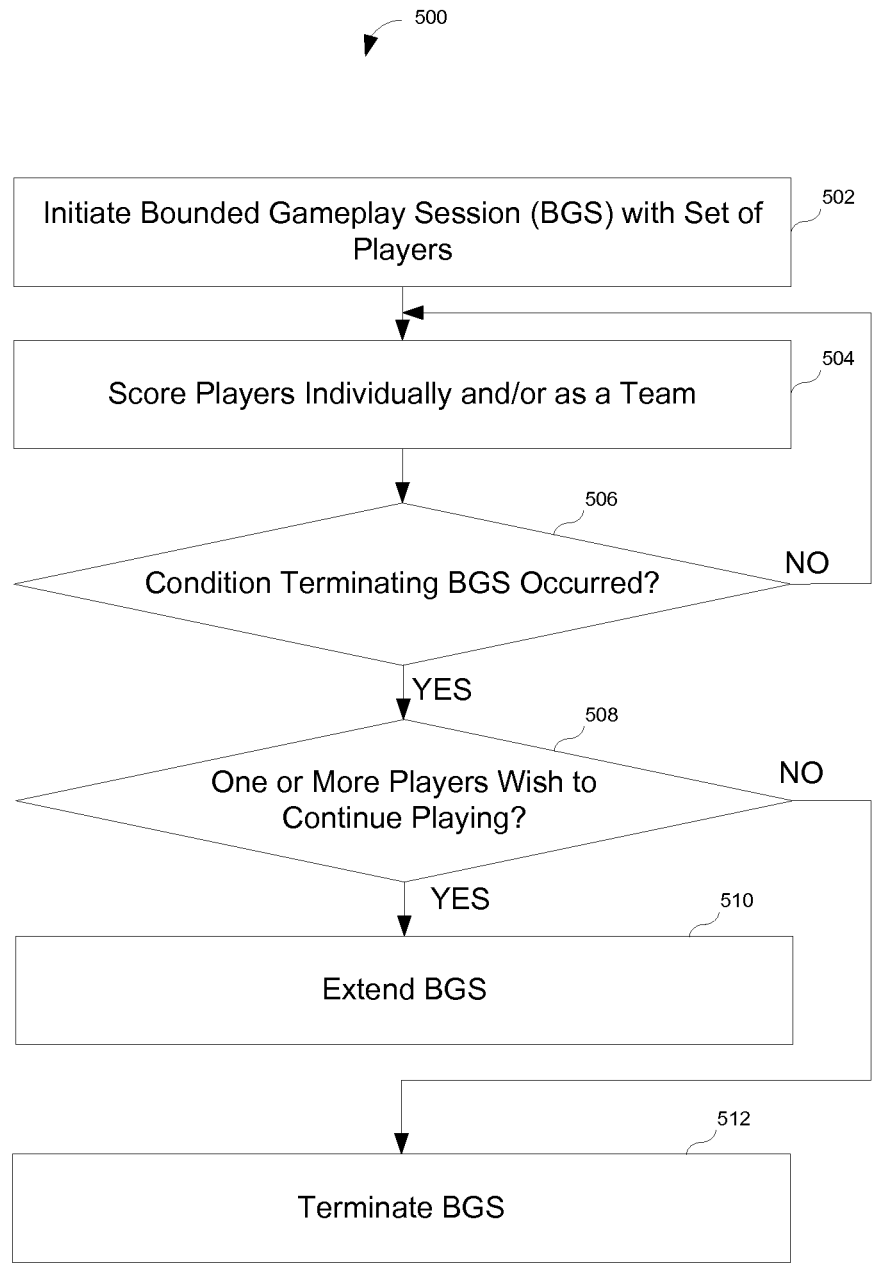
FIG. 5 depicts an exemplary process for initiating and extending a BGS, according to an implementation of the invention.

The various processing operations and/or data flows depicted in the exemplary flowcharts of FIGS. 3-5 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Exemplary Process for Providing Continuous Gameplay Through a UGS

FIG. 3 depicts an exemplary process for providing continuous gameplay in a multiplayer video game through an UGS, according to an implementation of the invention.

In an operation 302, a UGS may be initiated. For example, a set of players may be matched to play with and/or against one another.

In an operation 304, players may be scored individually and/or as a team. For example, each player or team may be scored according to a time-based parameter that incorporates a temporal aspect. In a particular example, a player and/or team may be scored based on a performance per unit of time, an interval (e.g., a performance within the last five minutes), and/or temporal aspect. Other types of scores, such as based on a type of weapon used, a style of gameplay, and/or other aspects of gameplay may be assessed as well.

In an operation 306, a determination of whether to add a player to the UGS may be made. For instance, a player may wish to join a gameplay session already in progress. The player may be added to the UGS, which may require acceptance by existing players in the UGS or may be automatic based on game rules. In some instances, for example, players may choose to participate in a UGS even with only 11 players even though 12 may be required. In this example, the UGS may be initiated and a twelfth player may be added when available. If a player should be added, processing may proceed to operation 314, in which a new player is selected and added to the UGS. The new player may be selected based on selections from matchmaking engine 122.

In an operation 308, a determination of whether a player should be removed from the UGS may be made. A player should be removed from the UGS when, for example, the player voluntarily chooses to leave, when a disadvantage is to be imposed on a team (as described herein), when a network connection to the player has been lost, and/or when a player should otherwise no longer continue playing in the UGS. If a player should be removed, the player may be removed from the UGS in an operation 310. If the player should not be removed, processing may return to operation 304, in which players and/or teams are scored.

In an operation 312 a determination of whether the removed player should be replaced is made. A player should be replaced when, for example, the removed player voluntarily left the UGS, a network connection to the removed player was lost, and/or when the team from which the removed player should have a replacement player. If the removed player should be replaced, in an operation 314, a new player may be selected and added to the UGS.

If a player should not be replaced, processing may proceed to an operation 316, in which a determination of whether any players remain in the UGS may be made. If players remain in the UGS, processing may return to operation 304. If no more players remain in the UGS (or no players have expressed interest in remaining in the UGS), the UGS may be terminated in an operation 318. Terminating a UGS may include compiling scores for all players who participated in the UGS and communicating the scores to those players or otherwise making the scores available through one or more game interfaces.

Exemplary Process for Providing an Adjustment Feature

FIG. 4 depicts an exemplary process for providing an adjustment feature to players in a mismatched gameplay session, according to an implementation of the invention.

In an operation 402, a set of players may be matched for a UGS and the UGS may be initiated.

In an operation 404, scores for one or more players may be determined during a UGS. For example, scores of individual players and/or team of players may be tallied and compared to an opposing player or opposing team of players. The scores may be measured based on one or more performance metrics (e.g., number of kills in a shooter game, lap times in a racing game, etc.).

In an operation 406, a determination of whether a player and/or team are mismatched may be made. A mismatch may occur when a performance gap between the player and/or team and an opposing player and/or team exists. In some instances, a mismatch may be deemed to occur when the performance gap exceeds a threshold value. The performance gap may be determined based on a comparison of the scores for a player and/or team and an opposing player and/or team. If no mismatch exists, processing may return to operation 404, where one or more players are scored.

If a mismatch exists, in an operation 408, an adjustment feature may be identified. An adjustment feature may include an advantage provided to a losing player and/or team (e.g., a player and/or team having a lower score) and/or a disadvantage provided to a winning player and/or team (e.g., a player and/or team having a higher score).

In an operation 410, the adjustment feature may be applied during a UGS. Processing may return to operation 404, in which players are scored. In this manner, the leveling process may be iterative in that a performance gap and whether a mismatch occurs are periodically determined throughout the UGS. In other implementations, the adjustment feature may be applied only once during a given UGS.

Exemplary Process for Initiating and Extending a BGS

FIG. 5 depicts an exemplary process for initiating and extending a BGS, according to an implementation of the invention.

In an operation 502, a BGS may be initiated. A bounded gameplay session may be terminated after a predefined condition has occurred, such as a passage of a predefined time (e.g., a ten minute game session) or achievement of a predefined objective (e.g., a certain number of kills).

In an operation 504, players may be scored individually and/or as a team. Such scoring may be cumulative for the BGS. For example, the score may include a cumulative number of kills made by a player during the entire BUS.

In an operation 506, a determination of whether a BGS terminating event has occurred may be made. A BGS terminating event may include the passage of a predefined time or achievement of a predefined objective.

If a BGS terminating event has occurred, in an operation 508, a determination of whether one or more players wish to continue the BGS may be made. For instance, each player playing in the BGS may be prompted to indicate whether they wish for the BGS to continue.

If at least one player wishes to continue playing, the BGS may be extended by a predefined time (e.g., continue gameplay for five more minutes) or by a predefined objective (e.g., continue gameplay until fifty more kills occur) in an operation 510. Only those players wishing to extend gameplay may continue to play in the extended BGS. Processing may then return to operation 504.

However, if not all players have elected to continue playing in the extended BGS, scoring may be switched to a UGS-style scoring mechanism, in which a time-based or other parameter is applied to player scores. When the extended BGS is terminated, separate scores may be reported for the standard (non-extended) BGS and for the extended BUS. In this manner, players in the standard BGS may be scored as usual, while players participating in the extended BGS may be separately scored according to a UGS-style scoring mechanism as well.

If too few players wish to continue playing, the BGS may be terminated in an operation 512.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method of providing continuous gameplay in a multiplayer video game through an unbounded gameplay session that runs continuously until all players have exited the unbounded gameplay session, the method being implemented in a host computer having one or more physical processors programmed with computer program instructions that, when executed by the one or more physical processors, cause the host computer system to perform the method, the method comprising:
    initiating, by the host computer, the unbounded gameplay session with a set of matched players;
    adding, by the host computer during the unbounded gameplay session, a new player to the unbounded gameplay session after the unbounded gameplay session has commenced;
    generating, by the host computer during the unbounded gameplay session, a first score for at least a first player of the set of matched players and a second score for the new player, wherein the first score and the second score are not dependent on a total length of time the first player or the new player have played the unbounded gameplay session;
    determining, by the host computer during the unbounded gameplay session, a first team score for a first team of players from among players participating in the unbounded gameplay session and a second team score for a second team of players from among the players participating in the unbounded gameplay session, wherein the second team score is lower than the first team score;
    determining, by the host computer during the unbounded gameplay session, a performance gap based on the first team score and the second team score;
    determining, by the host computer during the unbounded gameplay session, a mismatch between the first team of players and second team of players based on the performance gap;
    identifying, by the host computer during the unbounded gameplay session, an adjustment feature based on the mismatch; and
    applying, by the host computer during the unbounded gameplay session, an adjustment feature based on the mismatch in order to provide a playing advantage to the second team.

2. The computer-implemented method of claim 1, the method further comprising:
    removing, by the host computer, the first player from the unbounded gameplay session;
    selecting, by the host computer, a replacement player to replace the first player based on one or more match-making parameters; and
    adding, by the host computer, the replacement player to play in the unbounded gameplay session.

3. The computer-implemented method of claim 2, the method further comprising:
    receiving, by the host computer, a request from the first player to rejoin the unbounded gameplay session; and
    adding, by the host computer, the first player to play in the unbounded gameplay session responsive to the request.

4. The computer-implemented method of claim 1, wherein generating the first score comprises:
    determining, by the host computer, a performance of the first player, wherein the first score is based on the performance.

5. The computer-implemented method of claim 4, wherein generating the first score comprises:
    determining, by the host computer, a virtual item used by the first player; and
    associating, by the host computer, the virtual item with the performance, wherein the first score is correlated with the virtual item.

6. The computer-implemented method of claim 4, wherein generating the first score comprises:
    determining, by the host computer, a second player playing with the first player; and
    associating, by the host computer, the second player with the performance, wherein the first score is correlated with the second player.

7. The computer-implemented method of claim 1, wherein the advantage comprises an additional player for the second team, the method further comprising:
    identifying, by the host computer, the additional player to be added to the second team; and
    adding, by the host computer, the additional player to play with the second team in the unbounded gameplay session.

8. The computer-implemented method of claim 1, wherein the adjustment feature comprises a disadvantage for the first team.

9. The computer-implemented method of claim 1, wherein determining the mismatch comprises:
    determining that the mismatch is not sufficiently large to encourage an uneven match, wherein the adjustment feature is identified to generate the uneven match.

10. The computer computer-implemented method of claim 1, wherein determining the mismatch comprises:
    determining that the mismatch is too large to encourage an even match, wherein the adjustment feature is identified to generate the even match.

11. The computer-implemented method of claim 1, wherein the first score and the second score are each based on a time-based parameter and wherein the time-based parameter comprises a rate such that the first score and the second score each comprises a performance per unit of time.

12. The computer-implemented method of claim 1, wherein the first score and the second score are each based on a time-based parameter and wherein the time-based parameter comprises a latest time interval such that the first score and the second score each comprises a performance within the latest time interval.

13. A system for providing continuous gameplay in a multiplayer video game through an unbounded gameplay session that runs continuously until all players have exited the unbounded gameplay session, the system comprising:
- a host computer comprising one or more physical processors programmed with one or more computer program instructions which, when executed, programs the computer system to:
- initiate the unbounded gameplay session with a set of matched players;
- add a new player to the unbounded gameplay session after the unbounded gameplay session has commenced;
- generate, during the unbounded gameplay session, a first score for at least a first player of the set of matched players and a second score for the new player, wherein the first score and the second score are not dependent on a total length of time the first player or the new player have played the unbounded gameplay session;
- determine, during the unbounded gameplay session, a first team score for a first team of players from among players participating in the unbounded gameplay session and a second team score for a second team of players from among the players participating in the unbounded gameplay session, wherein the second team score is lower than the first team score;
- determine, during the unbounded gameplay session, a performance gap based on the first team score and the second team score;
- determine, during the unbounded gameplay session, a mismatch between the first team of players and second team of players based on the performance gap;
- identify, during the unbounded gameplay session, an adjustment feature based on the mismatch; and
- apply, during the unbounded gameplay session, an adjustment feature based on the mismatch in order to provide a playing advantage to the second team.

14. The system of claim 13, wherein the host computer system is further programmed to:
- remove the first player from the unbounded gameplay session;
- select a replacement player to replace the first player based on one or more matchmaking parameters; and
- add the replacement player to play in the unbounded gameplay session.

15. The system of claim 14, wherein the host computer system is further programmed to:
- receive a request from the first player to rejoin the unbounded gameplay session; and
- add the first player to play in the unbounded gameplay session responsive to the request.

16. The system of claim 13, wherein to generate the first score, the host computer system is further programmed to:
- determine a performance of the first player, wherein the first score is based on the performance.

17. The system of claim 16, wherein to generate the first score, the host computer system is further programmed to:
- determine a virtual item used by the first player; and
- associate the virtual item with the performance, wherein the first score is correlated with the virtual item.

18. The system of claim 16, wherein to generate the first score, the host computer system is further programmed to:
- determine a second player playing with the first player; and
- associate the second player with the performance, wherein the first score is correlated with the second player.

19. The system of claim 13, wherein the advantage comprises an additional player for the second team, wherein the host computer system is further programmed to:
- identify the additional player to be added to the second team; and
- add the additional player to play with the second team in the unbounded gameplay session.

20. The system of claim 13, wherein the adjustment feature comprises a disadvantage for the first team.

21. The system of claim 13, wherein to determine the mismatch, the host computer system is further programmed to:
- determine that the mismatch is not sufficiently large to encourage an uneven match, wherein the adjustment feature is identified to generate the uneven match.

22. The system of claim 13, wherein to determine the mismatch, the host computer system is further programmed to:
- determine that the mismatch is too large to encourage an even match, wherein the adjustment feature is identified to generate the even match.

23. The system of claim 13, wherein the first score and the second score are each based on a time-based parameter and wherein the time-based parameter comprises a rate such that the first score and the second score each comprises a performance per unit of time.

24. The system of claim 23, wherein the first score and the second score are normalized based on the number of players.

25. The system of claim 13, wherein the first score and the second score are each based on a time-based parameter and wherein the time-based parameter comprises a latest time interval such that the first score and the second score each comprises a performance within the latest time interval.

26. A computer program product for providing continuous gameplay in a multiplayer video game through an unbounded gameplay session that runs continuously until all players have exited the unbounded gameplay session, the computer program product comprising:
- one or more tangible, non-transitory computer-readable storage devices;
- program instructions, stored on at least one of the one or more tangible, non-transitory computer-readable tangible storage devices that, when executed, programs a host computer to:
- initiate the unbounded gameplay session with a set of matched players;
- add a new player to the unbounded gameplay session after the unbounded gameplay session has commenced;
- generate, during the unbounded gameplay session, a first score for at least a first player of the set of matched players and a second score for the new player, wherein the first score and the second score are not dependent on a total length of time the first player or the new player have played the unbounded gameplay session;
- determine, during the unbounded gameplay session, a first team score for a first team of players from among players participating in the unbounded gameplay session and a second team score for a second team of players from among the players participating in the unbounded gameplay session, wherein the second team score is lower than the first team score;
- determine, during the unbounded gameplay session, a performance gap based on the first team score and the second team score;
- determine, during the unbounded gameplay session, a mismatch between the first team of players and second team of players based on the performance gap;
- identify, during the unbounded gameplay session, an adjustment feature based on the mismatch; and apply, during the unbounded gameplay session, an adjustment feature based on the mismatch in order to provide a playing advantage to the second team.

\* \* \* \* \*